United States Patent [19]

Brand

[11] Patent Number: 5,041,162

[45] Date of Patent: Aug. 20, 1991

[54] PROCESS FOR PRODUCING DURABLE TITANIUM DIOXIDE PIGMENT

[75] Inventor: John R. Brand, Oklahoma City, Okla.

[73] Assignee: Kerr-McGee Chemical Corporation, Oklahoma City, Okla.

[21] Appl. No.: 570,590

[22] Filed: Aug. 20, 1990

Related U.S. Application Data

[63] Continuation of Ser. No. 331,028, Mar. 30, 1989, abandoned, which is a continuation of Ser. No. 182,087, Apr. 15, 1988, abandoned.

[51] Int. Cl.$^5$ .............................................. C09C 1/36
[52] U.S. Cl. .................................... 106/446; 106/442; 106/400; 106/401
[58] Field of Search .............................. 106/446, 442

[56] References Cited

U.S. PATENT DOCUMENTS

| | | | |
|---|---|---|---|
| Re. 27,818 | 11/1973 | Werner | 106/300 |
| 3,876,442 | 4/1975 | Thomas | 106/446 |
| 3,928,057 | 12/1975 | DeColibus | 106/300 |
| 3,954,496 | 5/1976 | Batzar | 106/308 B |
| 4,075,031 | 2/1978 | Allen | 106/300 |
| 4,125,412 | 11/1978 | West | 106/300 |
| 4,199,370 | 4/1980 | Brand | 106/446 |

FOREIGN PATENT DOCUMENTS 0073340 7/1982 European Pat. Off. .

Primary Examiner—William R. Dixon, Jr.
Assistant Examiner—Scott L. Hertzog
Attorney, Agent, or Firm—Herbert M. Hanegan

[57] ABSTRACT

An improved process is provided for preparing durable titanium dioxide pigments having discrete layers of silica and alumina deposited thereon. The improved process includes careful control of the operating conditions of pH end temperature of a slurry of titanium dioxide pigment during the addition of the coating materials to the slurry and the deposition of the silica and alumina onto the pigment.

12 Claims, No Drawings

PROCESS FOR PRODUCING DURABLE TITANIUM DIOXIDE PIGMENT

This application is a continuation of application Ser. No. 331,028, filed Mar. 30, 1989, which is a continuation of application Ser. No. 182,087, filed Apr. 15, 1988, both now abandoned.

FIELD OF THE INVENTION

The present invention relates to a process for the preparation of coated titanium dioxide pigments. More particularly, the present invention relates to a process for preparing durable titanium dioxide pigments having deposited thereon discrete layers of silica and alumina.

BACKGROUND OF THE INVENTION

Many processes are known for applying hydrous oxides of metals such as silicon and aluminum to titanium dioxide pigments to produce durable pigments having varying levels of physical and optical properties. In the main, these processes have consisted of batch-type processes which, in order to produce a pigment of high durability, require long treatment times. For example, U.S. Pat. No. RE 27,818 discloses a batch process for preparing titanium dioxide pigments having deposited thereon a dense inner coating of amorphous silica and an outer coating of alumina which pigment is reported to exhibit outstanding durability, high opacity and good dispersibility. To achieve these properties, control of the temperature, time and pH of the reaction medium during silica deposition is essential. However, the process described in this reference is time consuming, typically requiring long acid addition times (e.g., over four hours for an 8 percent silica coating) to slowly lower the pH of the reaction medium to precipitate the silica.

Further examples of batch-type processes are the processes taught in U.S. Pat. Nos. 3,928,057; 3,954,496 and 4,075,031. All of these references disclose processes in which a dense silica coating is applied to a titanium dioxide pigment by slowly lowering the pH of the reaction medium to precipitate the silica.

In addition to the above mentioned batch processes, a number of continuous processes for preparing durable titanium dioxide pigments having silica and alumina deposited thereon also are known. Purportedly these processes are capable of overcoming the shortcomings of the batch-type processes, namely the excessively long processing times. One such process is disclosed in U.S. Pat. No. 4,125,412. In this patent, a process is described wherein a slurry of titanium dioxide is prepared and heated to a temperature of from 80° C. to 100° C. To this heated slurry is rapidly added a solution of sodium silicate. Upon completion of this addition, the pH of the slurry is adjusted to from 9 to 10.5 and maintained at this value for from 15 to 60 minutes to cure the silica coating. The pH of the slurry then is adjusted to about 8 and rapid addition of sodium aluminate and acid simultaneously are commenced in a manner sufficient to maintain the slurry pH at a value of from 7 to 9. Finally, the slurry is filtered and the recovered pigment washed and dried.

Another known process is the process described in European Patent Application No. 82/106706.9 published Mar. 9, 1983. According to this published application a slurry of titanium dioxide pigment, having a pH of from 9.8 to 10.1, is heated to at least 85° C. To this slurry is added a soluble silicate compound in an amount sufficient to provide from 0.6 percent to 10 percent of silica as a dense silica coating. The slurry then is neutralized in three separate steps or stages by the addition of sufficient amounts of an acid to achieve pH levels of between about 9.6 and about 9.8; about 9.2 and about 9.4 and about 3 and about 4 during each of said successive steps. At a pH between about 5 and about 6.5, an aluminate compound and an acid are simultaneously introduced into the slurry whereby alumina, in an amount of from 1.5 to 10 percent, is deposited onto the pigment. Finally, the pH of the slurry is adjusted to a value of about 7.5, the slurry filtered and the recovered pigment washed and dried. The essence of the process disclosed in this patent is stated to reside in close control of (1) the temperature and pH of the slurry to assure close contact between the pigment and the soluble silicate prior to initiation of precipitation of the silica and (2) the speed of precipitation (through a step-wise neutralization procedure) of the silica coating.

While the above continuous type processes purportedly overcome the major shortcoming of the previously known batch processes, i.e., excessively long processing times, adaptation of such continuous processes generally will entail significant capital investments in process equipment and controls to convert most current commercial production facilities to continuous operations. Thus, an improved batch-type process capable of producing titanium dioxide pigments having deposited thereon separate and discrete coatings of silica and alumina in shorter process times would represent an advancement in this art.

SUMMARY OF THE INVENTION

The present invention is directed to an improved batch-type process for preparing durable titanium dioxide pigments having deposited thereon a dense amorphous inner coating of silica and an outer coating of alumina.

In accordance with the process of the present invention, an aqueous slurry of a base titanium dioxide pigment having a pH of at least about 9.8 is heated to an elevated temperature. To this heated slurry is rapidly added a water soluble silicate compound while maintaining the heated slurry at an elevated temperature whereby an initial deposition and cure of a dense amorphous coating of silica onto the pigment in the heated slurry commences. Following the addition of the silicate compound, the pH of the heated slurry is rapidly adjusted to a value of from about 9.2 to about 9.4, while maintaining the heated slurry at the elevated temperature, to complete the deposition and cure of the silica coating.

The heated slurry containing titanium dioxide pigment having a coating of dense amorphous silica deposited thereon, then is rapidly adjusted to a pH of from about 2.8 to about 3.2. Addition of an amount of a water soluble aluminum-containing compound sufficient to raise the pH of the heated slurry to a value of from about 5.5 to about 6.5 is commenced. This addition is continued until an amount sufficient to provide an outer coating of alumina of a predetermined weight on the silica coated pigment is achieved. During this continued addition, the pH of the heated slurry is maintained at the value of from about 5.5 to about 6.5.

Upon completion of the addition of the aluminum-containing compound the slurry is adjusted to a final pH value of from about 6.5 to about 8.5 and the coated pigment product recovered from the slurry.

DETAILED DESCRIPTION OF THE INVENTION

Broadly, the present invention relates to an improved process for the preparation of titanium dioxide pigment characterized by good durability, optical quality and ease of processing. More particularly, the present invention relates to an improved batch-type process for preparing titanium dioxide pigments coated with separate and discrete layers of silica and alumina in a quick, efficient and economical manner.

The improved process of the present invention may be used in the treatment of either anatase or rutile titanium dioxide pigment prepared in any manner. Thus, the improved process of the present invention is applicable to the treatment of titanium dioxide pigment prepared by either the well-known sulfate process or the well-known chloride process. Both of these wellknown processes are generally described in U.S. Pat. No. RE 27,818, and which descriptions are incorporated herein by reference. Generally, the titanium dioxide pigments employed in the process of this invention will be wet milled and hydroclassified prior to treatment in accordance with the process of this invention to provide a pigment of substantially uniform particle size. Methods for wet milling and hydroclassifying titanium dioxide pigments also are well-known to those skilled in this art.

The first step in the process of the present invention comprises the formation of an aqueous slurry of the titanium dioxide pigment to be treated, adjustment of the slurry to an alkaline pH and the heating of the pH adjusted slurry to the requisite elevated temperatures. Advantageously, the aqueous slurry is formed by suspending the wet milled and hydroclassified pigment in an aqueous medium such as water in an amount sufficient to provide a slurry containing from about 20 to about 45 weight percent solids. In addition, a dispersing agent, soluble in the aqueous medium employed, also may be added to the slurry to maintain the pigment in a highly dispersed state in the aqueous medium. Representative examples of suitable dispersing agents include such water soluble inorganic compounds as sodium hexametaphosphate, sodium polyphosphate, sodium hydroxide, and the like.

Titanium dioxide pigments, whether prepared by the sulfate process or by the chloride process are acidic in nature and produce a slurry having an acidic pH when suspended in an aqueous medium. To deposit silica upon such pigments and particularly, to deposit silica in the form of a dense, amorphous coating, requires that the slurry pH be adjusted to a value of at least 9.8. Most usually this pH adjustment readily can be achieved by adding a water soluble alkaline compound such as ammonia, sodium hydroxide or other suitable alkaline compound to the slurry. The amount of the alkaline compound added to the slurry will be an amount sufficient to adjust the slurry to a pH of at least 9.8 and preferably to a pH in the range of from about 9.8 to about 10.2.

The slurry, once formed, is heated to an elevated temperature and maintained at said temperature throughout the remainder of the process. In general, the elevated temperatures employed in the practice of the present invention will range from about 75° C. to about 90° C.

Following the formation and heating of the slurry, the water soluble silicate compound is rapidly added to the heated slurry in an amount sufficient to provide from about 0.5 to about 5.0 weight percent, based on the total weight of the coated titanium dioxide pigment, of silica as a dense amorphous coating upon the pigment. For purposes of the present invention, any water soluble silicate compound capable of providing silica for deposition upon the titanium dioxide pigment under the operating conditions of the process may be employed. Generally, the water soluble silicate compound of preference is sodium silicate, although similar water soluble alkali metal silicates also can be utilized.

The heated slurry, containing the added water soluble silicate compound, is maintained at the pH of at least about 9.8 and at an elevated temperature in the range of from about 75° C. to about 90° C. for a period of time sufficient to allow for initiation of the deposition and curing of the silica upon the pigment contained in the slurry. Generally, such period can range from about 5 minutes to about 40 minutes with a period of from about 15 to about 20 minutes being preferred.

During this period, the silica initially precipitated from the added water soluble silicate compound is believed to form nucleation sites on the surface of the titanium dioxide pigment from which the growth of the dense amorphous coating of silica proceeds. As the precipitation of further silica occurs and its attraction to and growth at these nucleation sites continues, the surface of the titanium dioxide pigment becomes covered with an essentially continuous and solid coating of the silica.

As disclosed hereinabove, during this initial deposition and curing period it is essential to maintain the pH and temperature at about the values specified. Any adjustments to these operating parameters can be effected by known means. For example, if adjustment of the pH of the slurry becomes necessary during this period, such adjustments can be made by simply adding a suitable acid (e.g., sulfuric acid) or suitable base (e.g., sodium hydroxide) to the slurry. Furthermore, the temperature of the slurry during this period can be maintained through the use of any conventional heating means including the use of steam.

At the end of this period, an acid such as sulfuric acid is rapidly added to the slurry to adjust the slurry pH to a value ranging from about 9.2 to about 9.4 to enhance the precipitation and deposition of the dense silica. Upon completing this pH adjustment, the slurry is maintained within the adjusted pH range for an additional period of time of from about 5 to about 40 minutes with a period of from about 15 to about 20 minutes being preferred. This additional period is required to complete the deposition and curing of the dense silica coating deposited upon the pigment.

On completion of the deposition and curing periods, the slurry is subjected to a second rapid adjustment in pH. This second adjustment also is accomplished by means of the rapid addition of an acid such as sulfuric acid to the slurry. In this instance, the slurry pH is adjusted to a value of from about 2.8 to about 3.2. At this point, addition of a water soluble aluminum-containing compound capable of providing alumina for deposition onto the dense, amorphous silica-coated titanium dioxide pigment in the slurry is commenced. The water soluble aluminum-containing compound is added in an amount sufficient to raise the slurry pH to a value in the range of from about 5.5 to about 6.5. Within this pH range, alumina is rapidly precipitated from the slurry medium and is deposited upon the silica coated titanium dioxide pigment.

For purposes of the present invention and the titanium dioxide products produced thereby, any water soluble aluminum-containing compound capable of providing alumina for deposition onto the silica-coated titanium dioxide pigment can be employed. Useful aluminum-containing compounds can be either alkaline or acidic in nature. Representative, but nonlimiting, examples include sodium aluminate, aluminum sulfate and the like. A preferred aluminum-containing compound for use in the process of the present invention is sodium aluminate.

Once the slurry pH has reached a value in the range of from about 5.5 to about 6.5, addition of the aluminum-containing compound is continued together with the simultaneous addition of an acid, e.g., sulfuric acid, to maintain the slurry pH within the above range. The addition of the water soluble aluminum-containing compound is continued until the total amount of the water soluble aluminum-containing compound added is sufficient to provide from about 1.5 to about 5.0 weight percent and preferably from about 2.0 to about 3.0 weight percent, based upon the total weight of the coated titanium dioxide, of alumina as an outer coating on the silica-coated titanium dioxide pigment is attained. With respect to this alumina deposition step, it is essential to maintain the slurry pH below about 7.0, preferably from about 5.5 to about 6.5, to provide a pigment having a high bulk density where thereby minimizes pigment blowover during subsequent fluid energy milling of the treated pigment.

Upon completion of the addition of the aluminum-containing compound, the slurry pH is adjusted to a value of from about 6.7 to about 6.9 using an alkali such as sodium hydroxide and filtered. The coated titanium dioxide pigment recovered by filtration, is washed to remove any soluble salts adhering to the pigment, dried and then subjected to final sizing using known fluid energy milling techniques.

The invention will be better understood by reference to the following illustrative, but nonlimiting example.

EXAMPLE

Fifteen hundred and sixty-six grams of titanium dioxide are mixed with sufficient water to provide a slurry containing 35 weight percent solids and this slurry heated to a temperature of 90° C. The pH of this heated slurry is acidic and is adjusted to a value of 10 by the addition thereto of 17.5 ml. of a 5N solution of sodium hydroxide. Then 90.5 ml of sodium silicate, as a 216 g/l solution equivalent to 1.2 weight percent of silica ($SiO_2$), are added to the heated slurry. This addition is effected over a period of about 6.5 minutes and upon completion of this addition the slurry pH is 10.5. The slurry is held at this pH and 90° C. for approximately 20 minutes.

At the end of this time, the pH of the slurry rapidly is adjusted to a value of 9.4 by the rapid addition of 4.0 ml of a 96% sulfuric acid solution and the slurry held at this pH value and the above temperature to complete the deposition and cure of the $SiO_2$ on the pigment.

Following this second 20 minute deposition and curing cycle, the pH of the slurry is again rapidly adjusted, this time to a value of 3.0 by the addition of a further 5.5 ml of the above 96% sulfuric acid solution. There is optionally added to the slurry 62.6 ml of magnesium sulfate as a 250 g/l solution for purposes of subsequent processing followed by addition of 176.8 ml of sodium aluminate as a 258 g/l solution equivalent to 2.8 weight percent of alumina ($Al_2O_3$). The addition of the sodium aluminate is effected over a period of 24 minutes during which time the slurry pH increases to and is maintained at a value of 5.5+0.5 by the simultaneous addition of a further 44 ml of the 96% sulfuric acid solution.

On completion of the addition of the sodium aluminate to the slurry, the pH of the slurry is adjusted to a value of 7.5 by addition of 50.5 ml of the 5N solution of sodium hydroxide. The slurry then is filtered, the pigment washed with distilled water, dried and ground in a conventional manner.

The treated pigment is characterized by possessing a photocatalytic activity value of 1.19, an alkyd scatter value of 5.86 and an acrylic gloss value of 54. These values are indicative of a pigment having very good durability, hiding power and gloss.

While the process constituting the present invention has been described in terms of what is believed to be the preferred embodiments, it is to be understood that changes and modifications can be made thereto without departing from the spirit and scope thereof.

I claim:

1. A batch process for preparing a coated titanium dioxide pigment having deposited thereon a dense amorphous inner coating of silica and an outer coating of alumina comprising:

forming an aqueous slurry of a noncoated titanium dioxide pigment, said slurry having a pH adjusted to a value of at least about 9.8 and heating said slurry to an elevated temperature ranging from about 75° C. to about 90° C.;

adding a water soluble silicate compound to said heated slurry while maintaining said heated slurry at said elevated temperature to initiate a deposition and cure of said dense amorphous inner coating of silica onto said pigment wherein said water soluble silicate compound is added to said heated slurry in an amount sufficient to provide from about 0.5 to about 5.0 weight percent, based on the total weight of the coated titanium dioxide pigment, of silica as a dense amorphous coating upon said pigment;

adjusting the pH of said heated slurry consisting of two steps:

(1) adjusting rapidly in a single adjusting step the pH of said heated slurry to a value of from 9.2 to about 9.4 while maintaining said heated slurry at said elevated temperature to complete the deposition and cure of said inner coating of silica; and (2) adjusting rapidly in a single adjusting step of pH of said heated slurry to a value of from about 2.8 to about 3.2 and thereafter commencing addition of an amount of a water soluble aluminum-containing compound sufficient to raise the pH of said heated slurry to a value of from about 5.5 to about 6.5 and to initiate a deposition of an outer coating of alumina on said silica coated pigment;

continuing the addition of said water soluble aluminum-containing to said heated slurry in an amount sufficient to provide an outer coating of said alumina of a predetermined weight on said silica coated pigment while maintaining the pH of said heated slurry at said value of from about 5.5 to about 6.5; and adjusting the pH of said heated slurry to a value of from about 6.5 to about 8.5 and recovering said coated titanium dioxide pigment substantially as produced.

2. The process of claim 1 wherein the adjusting of the slurry pH comprises adding a water soluble alkaline compound to the heated slurry in an amount sufficient to raise the slurry pH to the value of at least 9.8.

3. The process of claim 2 wherein the water soluble alkaline compound is sodium hydroxide and which compound is added in an amount sufficient to raise the slurry pH to a value in the range of from about 9.8 to about 10.2.

4. The process of claim 1 wherein the water soluble silicate added to the heated slurry is sodium silicate.

5. The process of claim 1 wherein the rapid adjustment of the slurry pH to a value in the range of from about 9.2 to about 9.4 comprises adding an acid to the heated slurry.

6. The process of claim 5 wherein the acid added to the heated slurry is sulfuric acid.

7. The process of claim 1 wherein the further rapid adjustment of the slurry pH to a value of from about 2.8 to about 3.2 comprises adding an acid to the heated slurry.

8. The process of claim 7 wherein the acid added to the heated slurry is sulfuric acid.

9. The process of claim 1 wherein the water soluble aluminate compound, added to both adjust the slurry pH to a value of from about 5.5 to about 6.5 and provide a source of alumina, is sodium aluminate.

10. The process of claim wherein the total amount of the sodium aluminate added is an amount sufficient to provide from about 1.5 to about 5.0 weight percent, based on the total weight of the coated titanium dioxide pigment, of alumina as the outer coating upon said coated pigment.

11. The process of claim 1 wherein the maintaining of the slurry pH at the value of from about 5.5 to about 6.5 during the continued addition of the water soluble aluminate compound comprises simultaneously adding a acid to the heated slurry.

12. The process of claim 11 wherein the added acid is sulfuric acid.

* * * * *

UNITED STATES PATENT AND TRADEMARK OFFICE
CERTIFICATE OF CORRECTION

PATENT NO. : 5,041,162
DATED      : August 20, 1991
INVENTOR(S) : JOHN R. Brand

It is certified that error appears in the above-identified patent and that said Letters Patent is hereby corrected as shown below:

Col. 6, line 60, after "containing" insert --compound--.

Col. 8, line 9, after "claim" insert --9--.

Signed and Sealed this

Thirtieth Day of March, 1993

*Attest:*

STEPHEN G. KUNIN

*Attesting Officer*   Acting Commissioner of Patents and Trademarks